United States Patent
Vitale et al.

(10) Patent No.: US 8,505,237 B2
(45) Date of Patent: Aug. 13, 2013

(54) PROCESS FOR ENHANCING PLANT GROWTH

(75) Inventors: Marcello Vitale, Castel d'Aiano (IT); Rayyan G. Hashem, Saida (LB); David M. Lines, Budaiya (BH); Federica Rossi, Bologna (IT); Rita Baraldi, Crevalcore (IT)

(73) Assignee: BASF SE, Ludwigshafen (DE)

(*) Notice: Subject to any disclaimer, the term of this patent is extended or adjusted under 35 U.S.C. 154(b) by 783 days.

(21) Appl. No.: 12/308,277

(22) PCT Filed: Jun. 13, 2007

(86) PCT No.: PCT/EP2007/055793
§ 371 (c)(1),
(2), (4) Date: Mar. 25, 2010

(87) PCT Pub. No.: WO2007/147758
PCT Pub. Date: Dec. 27, 2007

(65) Prior Publication Data
US 2010/0186294 A1    Jul. 29, 2010

(30) Foreign Application Priority Data
Jun. 22, 2006 (EP) .................. 06115868

(51) Int. Cl.
*A01G 1/00* (2006.01)
(52) U.S. Cl.
USPC .......................... 47/58.1 R; 47/17

(58) Field of Classification Search
USPC .................. 47/17, 20.1, 58.1 R, 58.1 LS
See application file for complete search history.

(56) References Cited

U.S. PATENT DOCUMENTS

| | | | |
|---|---|---|---|
| 3,911,620 A * | 10/1975 | Glatti .................. | 47/58.1 R |
| 5,022,181 A * | 6/1991 | Longstaff ............. | 47/31 |
| 6,441,059 B1 * | 8/2002 | Kieser et al. ......... | 523/135 |
| 2009/0247406 A1* | 10/2009 | De Corte et al. ..... | 504/189 |
| 2010/0186294 A1* | 7/2010 | Vitale et al. .......... | 47/58.1 R |

FOREIGN PATENT DOCUMENTS

| WO | 94/05727 | | 3/1994 |
|---|---|---|---|
| WO | WO9405727 | * | 3/1994 |

OTHER PUBLICATIONS
Derwent Abstract 2004-165483 [16] for RU 2220693, Jan. 10, 2004.

* cited by examiner

*Primary Examiner* — Frank T Palo
(74) *Attorney, Agent, or Firm* — Tyler A. Stevenson

(57) ABSTRACT

The instant invention relates to a process for enhancing plant growth in greenhouses or plant tunnels or over mulches by incorporating one or more yellow pigments or dyes into a greenhouse, mulch film or glazing and exposing the plants through or over such film to solar radiation so that specific and defined ratios of the light transmitted, emitted or reflected between 410 to 450 nm, 380 to 410 nm and 450 to 500 nm are obtained. A further aspect of the invention is the use of one or more yellow pigments or dyes as plant growth enhancing additive in polymeric films for greenhouses, plant tunnels or mulches or a coating for greenhouse glazing so that specific and defined ratios of the light transmitted, emitted or reflected between 410 to 450 nm, 380 to 410 nm and 450 to 500 nm are obtained.

8 Claims, 3 Drawing Sheets

Fig. 1: spectra of samples of Example 1
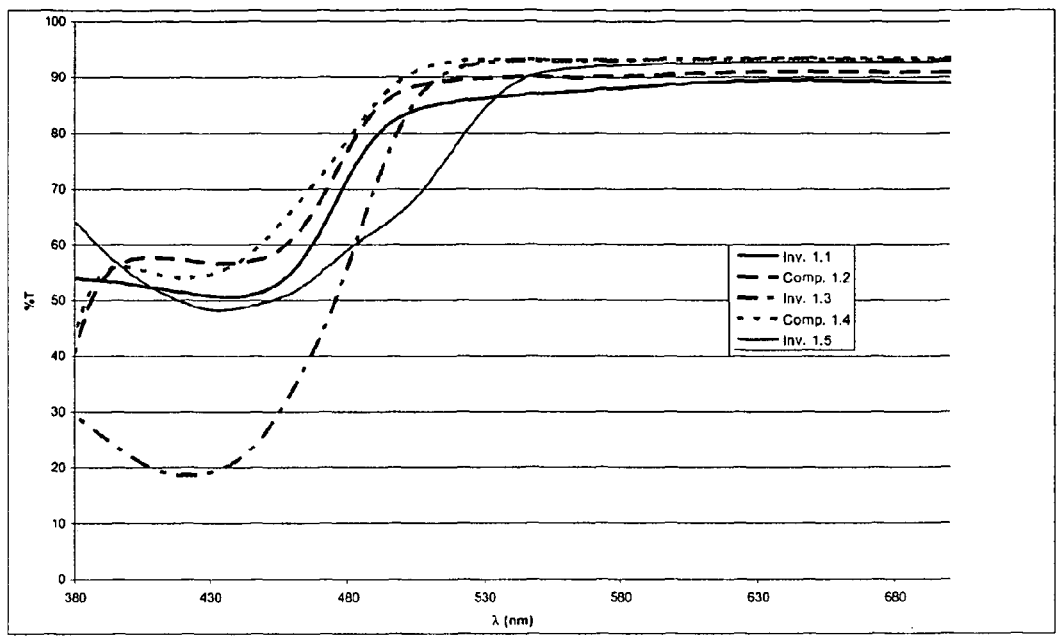
Fig. 2: spectra of samples of Example 1
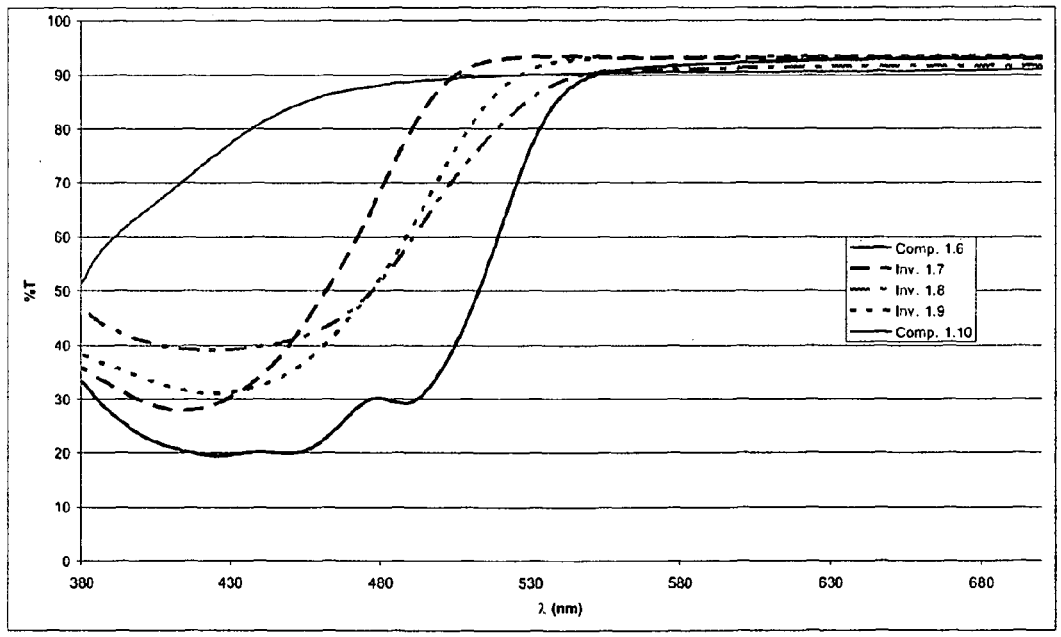

Fig. 3: spectra of samples of Example 2
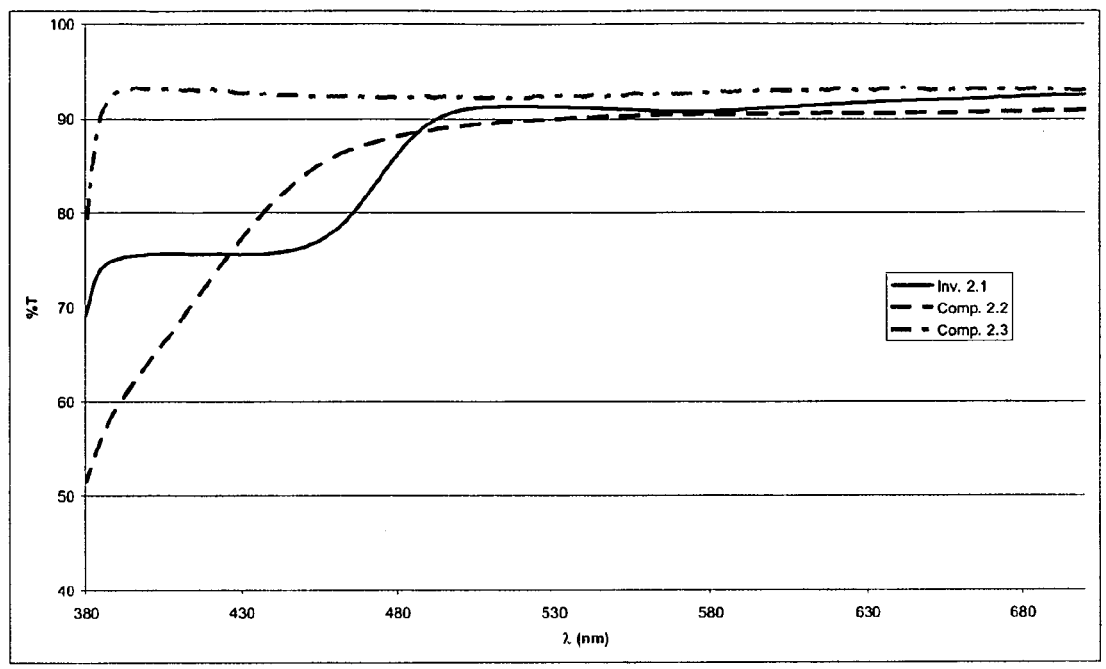
Fig. 4: spectra of samples of Example 3
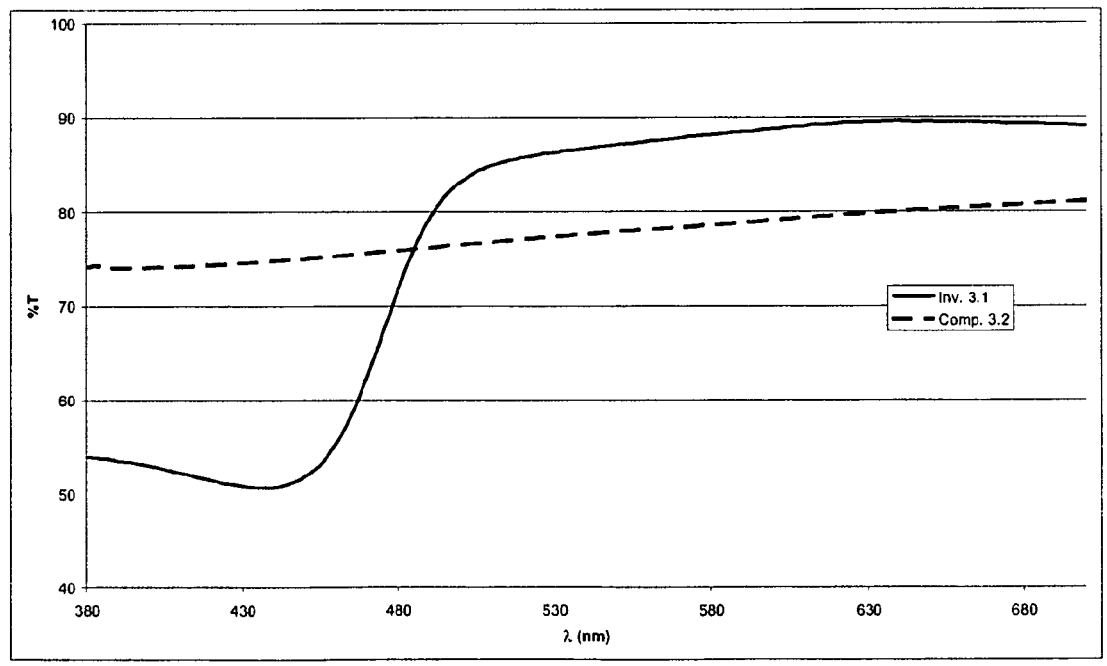

Fig. 5: spectra of samples of Example 4
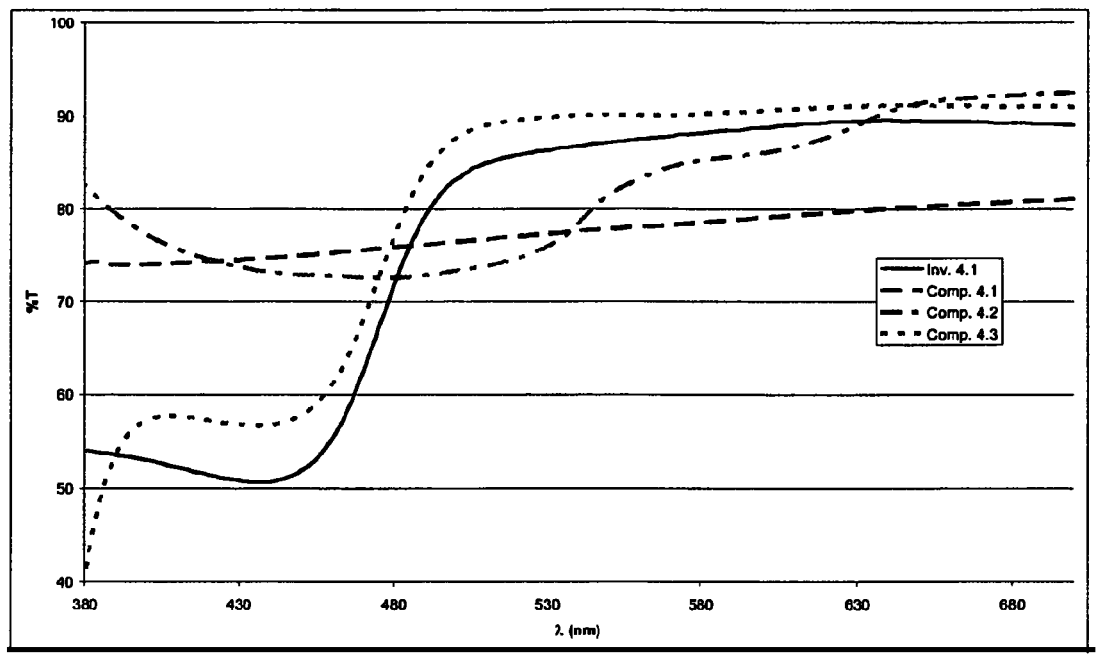
Fig. 6: spectra of samples of Example 5
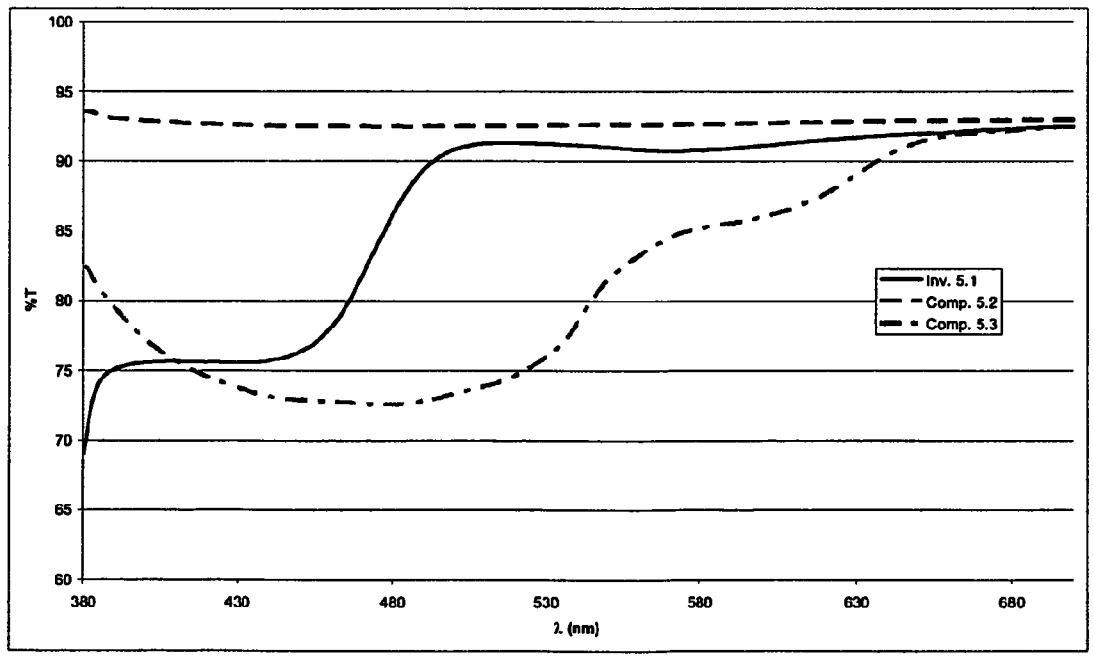

PROCESS FOR ENHANCING PLANT GROWTH

The instant invention relates to a process for enhancing plant growth in greenhouses or plant tunnels or over mulches by incorporating one or more yellow pigments or dyes into a greenhouse, mulch film or glazing and exposing the plants through or over such film to solar radiation so that specific and defined ratios of the light transmitted, emitted or reflected between 410 to 450 nm, 380 to 410 nm and 450 to 500 nm are obtained. A further aspect of the invention is the use of one or more yellow pigments or dyes as plant growth enhancing additive in polymeric films for greenhouses, plant tunnels or mulches or a coating for greenhouse glazing so that specific and defined ratios of the light transmitted, emitted or reflected between 410 to 450 nm, 380 to 410 nm and 450 to 500 nm are obtained.

BACKGROUND OF THE INVENTION

It is well known in the art that some types of crops are degraded by the UV-components of solar radiation, which must be filtered off to obtain high quality and productivity of the crops. Additionally, some microorganisms, e.g. *Botrytis Cinerea*, as well as some harmful insects, e.g. white flies, aphides, thrips or leafminers, can proliferate under specific UV-irradiation. These pests can be significantly reduced when UV light does not or to less extent reach the plants. [R. Reuveni et al., *Development of photoselective PE films for control of foliar pathogens in greenhouse-grown crops*, Plasticulture No. 102, p. 7 (1994); Y. Antignus et al., *The use of UV absorbing plastic sheets to protect crops against insects and spread of virus diseases*, CIPA Congress March 1997, pp. 23-33]. On the other hand, bee activity, requiring a certain band of UV radiation, needs to be retained in greenhouses in order to ensure fructification on flowering plants, e.g. tomato, cucumber, pumpkin etc.

Changes in the solar radiation effected by aptly placed materials can impact plant growth indirectly by changing other environmental factors. The more directly impacted environmental factor is temperature. Indeed, one of the principal original aims of greenhouses was to increase the temperature gain during the day and to decrease the temperature loss at night relative to the unprotected environment. Such benefit is being improved upon and fine-tuned by using materials that avoid excessive daytime heat gain or further decrease nighttime heat loss by regulating radiation flux in the near infrared (NIR, 700-2000 nm) and mid infrared (2-20 µm) regions of the electromagnetic spectrum. To this category, for example, belong materials claimed in WO-A-9405727, U.S. Pat. No. 4,895,904 and EP1652422. The present invention does not impact these frequency ranges.

Plant growth is more directly regulated by photosynthesis, photomorphogenesis and photoperiodicity. All these processes require light and contribute in a unique way to plant development. If the spectrum of the outside solar radiation can be significantly modified by the optical properties of the glazing or film covering a greenhouse or of a mulch covering the ground, a change in plant growth may occur. Changes in the radiation transmitted or reflected by the agricultural film induce photosynthetic and photomorphogenic effects and can result in modifications of the metabolism, architecture and shape of the plants with significant consequence on the value of the crop.

Light used by the plants for their energy needs is that falling within the PAR region (Photosynthetically Active Radiation), defined as all photons between 400 and 700 nm. The best known photomorphogenic parameter used by plants is the ratio of Red (600-700 nm) to Far Red (700-800 nm), as for example disclosed in EP1413599. On the other hand, the impact of higher energy blue light and very near UV, 380-500 nm, is also very important, as shown for example in Brian Thomas and H. G. Dickinson, *Evidence for two photoreceptors controlling growth in de-etiolated seedlings*, Planta No. 146 p. 545-550 (1979), although much less well understood. This wavelength range is the region of primary interest in the present invention Many attempts have been made to influence plant growth by manipulating natural light passing through coverings such as those employed in greenhouses and tunnels, or reflected by mulching sheets, starting at very early times [see, for example, Delaroquette, M., *Biologic action of sunlight*, the Journal of the American Medical Association No. 66, p. 65 (1915)]. One straightforward strategy is the selective absorption of specific light wavelength ranges. For example, increase in Red/Far Red can be obtained by using systems in which light of wavelength around 730 nm is absorbed preferentially relative to light of wavelength around 660 nm: these wavelengths are the maxima in the absorption spectra of the photo-interconvertible isomers of the phytochrome photoreceptor. Several patents claim such an effect, such as GB2314844, EP1080878 and U.S. Pat. No. 6,441,059. There are also some commercial products making the obtained Red/Far red increase a claim in their marketing literature (the "Solatrol" film by British Polythene is one such example, targeted at making more compact decorative plants).

However, the lack of knowledge about the reaction of plants to modifications in the intensity of other specific light wavelength ranges has made it until now impossible to make truly effective products. Indeed, many times it has been stated that an advantage had been found by means of a specific color or, more often, any color, as in WO-A-9405727, US3542710, EP1582555 and RO116242. The colors are variously defined as those of the material or those of the transmitted or reflected radiation. More often than not, the colors are not spectrally defined beyond their culturally-determined names (yellow, green, red, blue and so on). Sometimes they are defined by specifying the pigments or dye employed to obtain them, but often, such as in RO116242, the commercial names provided are too generic and do not define univocally a compound or a spectrum, making it impossible to replicate or exploit the findings. Similarly, WO-A-9405727 claims any colored material obtained by adding inorganic interference pigments to polymer films, especially those pigments preferentially reflecting or transmitting green light. However, none of these materials have found use in practice, due mostly to the poor spectral selectivity of the physical effect on which they rely, namely two-layer interference.

Indeed, the research leading to the present invention has shown that plants "see" colors very differently than humans do, and that they are sensitive to spectral variations both more subtle in intensity and more defined in wavelength than what is apparent to the human eye.

Surprisingly it has been found in comparative experiments, both under controlled laboratory conditions and under real-life conditions, that there is a positive reaction of plants to a specific solar spectrum modification in the 380 to 500 nm range, whereas other spectral modifications of the same wavelength region resulting in colors very similar for the human eye had either no effect or a negative impact on plants. The spectral modification that is the object of the present invention cannot be described under the simple color ratios (Red/Far Red, Blue/Red and so on, as in WO-A-9405727)

usually employed in both the patent and the scientific literature to describe the reaction of plants to light quality modifications.

SUMMARY OF THE INVENTION

One aspect of the invention is a process for enhancing bio-mass production in agricultural applications, by incorporating one or more pigments or dyes in a thermoplastic or crosslinked polymer, which is in the form of a film or glazing for greenhouses or small tunnel covers, a film or filament for shading nets and screens, mulch films, nonwovens or molded articles for the protection of young plants; and exposing the plant through or over that thermoplastic or crosslinked polymer to actinic radiation, characterized in that a) the resulting average light intensity variations (LIV) in the range between 380 and 450 nm are such that $$(LIV_{410\text{-}450}-LIV_{380\text{-}410})/|LIV_{410\text{-}450}| = \{[(I-I_0)/I_0]_{410\text{-}450}-[(I-I_0)/I_0]_{380\text{-}410}\}/\{\text{absolute value of }[(I-I_0)/I_0]_{410\text{-}450}\} \leq 0.04;$$

b) the resulting average light intensity variations in the range between 410 and 500 nm are such that $$(LIV_{410\text{-}450}-LIV_{450\text{-}500})/|LIV_{410\text{-}450}| = \{[(I-I_0)/I_0]_{410\text{-}450}-[(I-I_0)/I_0]_{450\text{-}500}\}/\{\text{absolute value of }[(I-I_0)/I_0]_{410\text{-}450}\} \leq -0.15; \text{ and}$$

c) the resulting average light intensity variation in the range between 410 and 450 nm $$(LIV_{410\text{-}450}=-0.90 \leq [(I-I_0)/I_0]_{410\text{-}450} \leq -0.10$$
$$\text{or } +0.05 \leq [(I-I_0)/I_0]_{410\text{-}450} \leq +0.50;$$

wherein $I_0$ in the respective wavelength range is the average light intensity in the range of the sample without pigment, multiplied by the wavelength interval;

$I$ in the respective wavelength range is the average light intensity in the range of the sample containing the pigment, multiplied by the wavelength interval.

BRIEF DESCRIPTION OF THE DRAWINGS

FIGS. 1 and 2 show the UV/Vis spectra of the samples of Example 1 in 150 micron plastic films.

FIG. 3 shows the UV/Vis spectra of samples of Example 2 in 180 micron 3:2 LDPE/LLDPE blown films.

FIG. 4 shows the UV/Vis spectra of samples of Example 3 in 150 micron LDPE blown films.

FIG. 5 shows the UV/Vis spectra of samples of Example 4 in 150 micron LDPE blown films.

FIG. 6 shows the UV/Vis spectra of samples of Example 5. Sample 5.1 is a 180 micron thick 3:2 LDPE/LLDPE blown film. Samples 5.2 and 5.3 are 150 micron thick LDPE blown films.

The spectra are presented as % T vs. wavelength (nm) and are performed on a Perkin Elmer LAMBDA 35 UV/Vis spectrometer equipped with an integrating sphere.

DETAILED DESCRIPTION OF THE INVENTION

The parameters $I$ and $I_0$ are measured as a function of wavelength, for example by means of a spectrophotometer with an integrating sphere in order to measure the direct and the scattered portion of the transmitted light.

For example the parameter $I_{0(400\text{-}420)}$ is calculated from the mean value between 400 nm and 420 nm multiplied by $\Delta\lambda=20$ nm. The other parameters in the above equations are determined analogously.

Absolute value in the equations above in the mathematical sense means always the positive number of the respective difference.

With "light intensity variation" (LIV), it is intended to express the difference between the light intensity after the modification is applied and the light intensity before the modification is applied, scaled by the light intensity before the modification is applied.

Since the expressions above use a quotient of intensities, relative numbers are obtained and no actinometric measurements have to be carried out to determine the absolute amount of photons transmitted in the respective interval.

Within the scope of this invention, any further selective light intensity modification may happen at the same time as the inventive one in regions of the solar spectrum outside of the 380-500 nm range, leading for example to changes in R/FR (600-700 nm vs. 700-800 nm) or in heat shielding effects (absorption or reflection of light of wavelength longer than 700 nm).

The inventive light modification can be obtained via the use of selectively light absorbing pigments or dyes, of selectively light-emitting pigments or dyes, of selectively light reflecting pigments or dyes or of their combination in any order.

Under actinic radiation there is understood electromagnetic radiation in the range of 300 to 800 nm, preferably solar radiation in the range between 400 and 700 nm. It is, however, also possible to use artificial light between 400 and 700 nm.

For example the one or more pigments or dyes are incorporated in an amount of totally 0.01% to 2% in particular from 0.05 to 1% by weight, based on the weight of the thermoplastic or crosslinked polymer. If more than one pigment is used each one is present in an amount from 0.01% to 0.5%.

Pigments are in general preferred.

Suitable pigments are yellow pigments selected from the group consisting of Monoazo Yellow Pigments, Disazo Condensation Pigments, Azo Laked or Salt Pigments, Metal Complex Pigments, Metal Salt Pigments, Isoindoline Pigments, Isoindolinone Pigments, Anthraquinine Pigments, Anthrapyrimidine Pigments, Quinophthalone Pigments and other Heterocyclics.

Individual pigments can be selected from the above classes. They are, for example, listed in Industrial Organic Pigments, edited by W. Herbst, K. Hunger, V C H Weinheim, New York, 1993 and are commercially available.

Suitable pigments are yellow pigments selected from the group consisting of C.I. Pigment Yellow 184, C.I. Pigment Yellow 93, C.I. Pigment Yellow 95, C.I. Pigment Yellow 168, C.I. Pigment Yellow 68, C.I. Pigment Yellow 183, C.I. Pigment Yellow 109, C.I. Pigment Yellow 13, C.I. Pigment Yellow 62, C.I. Pigment Yellow 199, C.I. Pigment Yellow 110, C.I. Pigment Yellow 128, C.I. Pigment Yellow 180, C.I. Pigment Yellow 155, C.I. Pigment Yellow 151, C.I. Pigment Yellow 215, C.I. Pigment Yellow 138 and C.I. Pigment Yellow 139.

If several commercial grades are available, those are preferred which are recommended for use in polymer applications. Pigments can also be provided in combination with a resin.

The thermoplastic polymer film can be made from a variety of polymers. Examples are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

- radical polymerisation (normally under high pressure and at elevated temperature).
- b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyllene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethyllene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferred is a thermoplastic polymer selected from the group consisting of a polyolefin, a polyester, a polyvinylalcohol, a polyvinylacetate and a polycarbonate.

Suitable thermoplastic polymers are also starch modified polyolefines, starch based polymer composites, biopolymers such as polycaprolactone, polylactic acid, polyglycollic acid, polyhydroxybutyrate-valerate, polybutylene succinate, polyvinyl alcohol, polyhydroxyalcanoate or polyethylene adipate.

Particularly preferred are polyolefins or polyvinylacetates, in particular (PE), polyethylene, (LDPE), low density polyethylene, linear low density polyethylene (LLDPE), (VLDPE), (ULDPE) and ethylvinylacetate (EVA).

Preferably the thermoplastic polymer is in the form of a film with a thickness from 10 μ to 300 μ, in particular from 10 μ to 200 μ.

In a specific embodiment of the process the film is a multilayer construction of between 2 and 7 polymer layers containing one or more pigments in at least 1 layer.

In this case a relatively large amount of the pigment or pigments, for example 1-15% by weight, is applied in a thin layer (10-20μ) to a shaped article made from a polymer containing little or no pigment. Application can be made at the same time as the shaping of the base article, for example by coextrusion. Alternatively, application can be made to the base article after it has been shaped, for example by lamination with a film or by coating with a solution.

In a further embodiment of the process the crosslinked polymer is a paint or coating on a transparent inorganic or organic support.

Examples for suitable paints or coatings are given below.
1. Crosslinked polymers derived from aldehydes on the one hand and phenols, ureas and melamines on the other hand, such as phenol/formaldehyde resins, urea/formaldehyde resins and melamine/formaldehyde resins.
2. Drying and non-drying alkyd resins.
3. Unsaturated polyester resins derived from copolyesters of saturated and unsaturated dicarboxylic acids with polyhydric alcohols and vinyl compounds as crosslinking agents, and also halogen-containing modifications thereof of low flammability.
4. Crosslinkable acrylic resins derived from substituted acrylates, for example epoxy acrylates, urethane acrylates or polyester acrylates.
5. Alkyd resins, polyester resins and acrylate resins crosslinked with melamine resins, urea resins, isocyanates, isocyanurates, polyisocyanates or epoxy resins.
6. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

Typically these crosslinked paints or coatings are applied on a polymeric substrate such as, for example, described above or on glass panels.

The thickness of the coating is typically from 10μ to 100μ, preferably from 20μ to 60μ.

It may be of advantage when an additional additive is incorporated in the thermoplastic or crosslinked polymer. The additive is suitably selected from the group consisting of a UV-absorber, a sterically hindered amine light stabilizer, a phenolic antioxidant, a phosphite or phosphonite, an antistatic additive, a processing aid, a filler or reinforcing material and an antifog additive.

Examples for individual additives are given below.

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-doclecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amyihydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.
1.4. Tocopherols, for example $\alpha$-tocopherol, $\beta$-tocopherol, $\gamma$-tocopherol, $\delta$-tocopherol and mixtures thereof (vitamin E).
1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.
1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methyllenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.
1.7. O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylMercaptoacetate.
1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
1.9. Aromatic hydroxybenzyl compounds, for example 1, 3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-d icyclohexyl-4-hydroxybenzyl)isocyanurate.
1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
1.12. Acylaminophenols, for example 4-hydroxylauranilide, 4-hydroxystearanilide, octyl N-(3,5-di-tert-butyl-4-hydroxyphenyl)carbamate.
1.13. Esters of 6-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.
1.14. Esters of $\beta$-(5-tert-butyl-4-hydroxy-3-methylphenyl) oropionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis [2-{3-(3-tert-butyl-4-hydroxy-5-methylphenyl)propionyloxy}-1,1-dimethylethyl]-2,4,8,10-tetraoxaspiro[5.5]-undecane.
1.15. Esters of $\beta$-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of (3-(3,5-di-tert-butyl-4-hydroxyphenyl)oropionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzo-triazole, 2-(3',5'-di-tert-butyl-2'-hydroxyphenyl)benzotriazole, 2-(5'-tert-butyl-2'-hydroxyphenyl)benzo-triazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzo-triazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzo-triazole, 2-(3'-tert-butyl-2'-hydroxy-5'-(2-octyloxycarbonylethyl)phenyl)benzo-triazole, 2-(3'-tert-butyl-5'-[2-(2-ethylhexyloxy)carbonylethyl]-2'-hydroxyphenyl)benzo-triazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

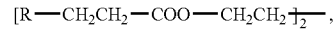

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzo-triazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-β-methoxycinnamate, methyl α-carbomethoxy-β-methoxycinnamate, N-(β-carbomethoxy(3-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydrooxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)buty-lamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-(2-Hydroxyphenyl)-1,3,5-triazines, for example 2, 4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenyl-propionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2, 4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''- nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl) phosphite,

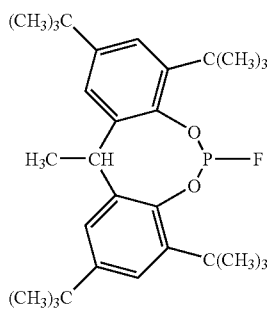
(A)

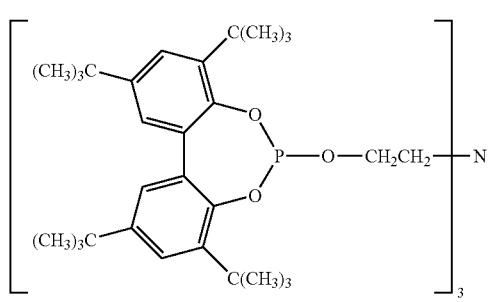
(B)

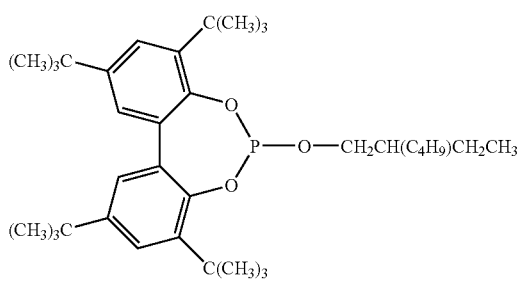
(C)

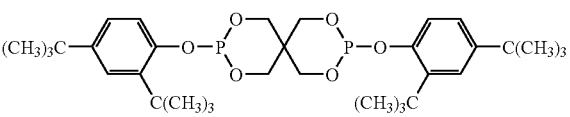
(D)

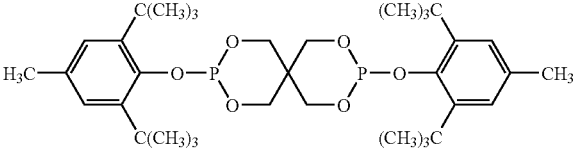
(E)

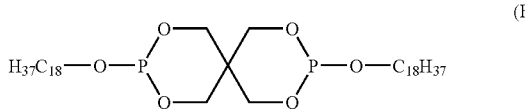
(F)

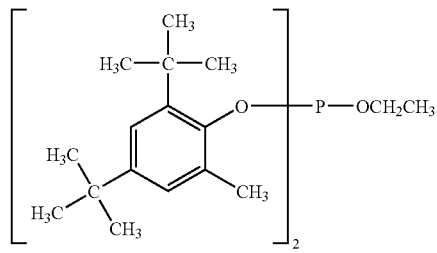
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxy-ylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosvnergists, for example dilauryl thiodipropionate, dimistryl thiodipropionate, distearyl thiodipropionate or distearyl disulfide.

8. Peroxide scavengers, for example esters of 8-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(8-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

A further aspect of the invention is the use of one or more yellow pigments selected from the group consisting of Monoazo Yellow Pigments, Disazo Condensation Pigments, Metal Complex Pigments, Isoindolinone Pigments and Anthrapyrimidine Pigments in a thermoplastic or crosslinked polymer, which is in the form of a film or glazing for greenhouses or small tunnel covers, a film or filament for shading nets and screens, mulch films, non-wovens or molded articles for the protection of young plants for enhancing bio-mass production in agricultural applications.

The following examples illustrate the invention.

General Remarks

In some of the tables below, the parameters of the invention are reported. These parameters are abbreviated as follows:

$A = (LIV_{410-450} - LIV_{380-410})/|LIV_{410-450}| = \{[(I-I_0)/I_0]_{410-450} - [(I-I_0)/I_0]_{380-410}\}/\{\text{absolute value of } [(I-I_0)/I_0]_{410-450}\} \leq 0.04$ $B = (LIV_{410-450} - LIV_{380-410})/|LIV_{410-450}| = \{[(I-I_0)/I_0]_{410-450} - [(I-I_0)/I_0]_{450-500}\}/\{\text{absolute value of } [(I-I_0)/I_0]_{410-450}\} \leq 0.04$ $C = LIV_{410-450} = [(I-I_0)/I_0]_{410-450}$ The following pigments are used:
Irgacolor Yellow 3GLM (Bismuth Vanadate) from Ciba Specialty Chemicals Inc., C.I. Pigment Yellow 184;
Ultramarine Blue from Holliday Pigments, C.I Pigment Blue 29; Carbon black, Plasblak PE2642 from Cabot Corp.
Cromophtal Yellow 2RLP, Isoindolinone from Ciba Specialty Chemicals Inc., C.I. Pigment Yellow 110
Cromophtal Yellow 2RF, Isoindolinone from Ciba Specialty Chemicals Inc., C.I. Pigment Yellow 139
Cromophtal Yellow HRPA, Monoazo from Ciba Specialty Chemicals Inc., C.I. Pigment Yellow 191:1
Cromophtal Yellow 8GNP, Disazo from Ciba Specialty Chemicals Inc., C.I. Pigment Yellow 128
Cromophtal Yellow 3GNP, Disazo from Ciba Specialty Chemicals Inc., C.I. Pigment Yellow 93
Cromophtal Yellow GRP, Disazo from Ciba Specialty Chemicals Inc., C.I. Pigment Yellow 95 Smartlight RL 1000, fluorescent pigment from Ciba Specialty Chemicals.

The following colorants or additional additives are used:
Cyasorb UV1084, Ni-quencher from Cytec;
Tinuvin 494 sterically hindered amine light stabilizer, with ZnO and Ca-stearate from Ciba Specialty Chemicals;
Tinuvin NOR 371, sterically hindered amine light stabilizer from Ciba Specialty Chemicals;
Tinuvin 326, benzotriazole UV-absorber from Ciba Specialty Chemicals;
Chimassorb 81, benzophenone UV-absorber from Ciba Specialty Chemicals CGX UVA 006, triazine UV absorber from Ciba Specialty Chemicals.

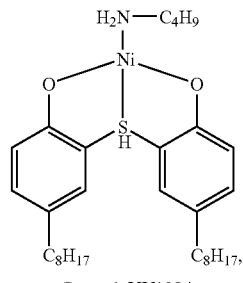

Cyasorb UV1084

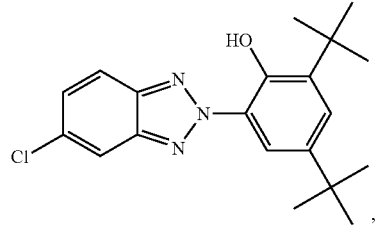

Tinuvin 326

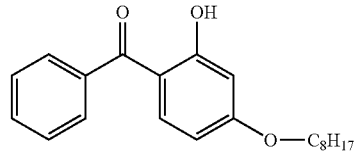

Chimassorb 81

EXAMPLE 1

A series of plastic films (150 micron thick) containing commercial yellow pigments and other additives were prepared and their optical spectra were measured (using a Perkin Elmer LAMBDA 35 UV/Vis spectrometer equipped with an integrating sphere) in order to compare the spectral light modifications they would provide. The film compositions are shown in Table 1. Several of such films fall under the present invention, others do not, failing to satisfy either the condition described by parameter A or B: the values of the invention parameters are reported in Table 2, and the spectra, measured with a Perkin Elmer Lambda 35 UV/Vis spectrometer, equipped with an integrating sphere, are shown in FIGS. 1 and 2.

TABLE 1

| Sample id. | w/w % | | w/w % | | w/w % |
|---|---|---|---|---|---|
| Inv. 1.1 | 0.2 | Irgacolor Yellow 3GLM | 0.8 | Tinuvin NOR 371 | |

TABLE 1-continued

| Sample id. | w/w % | | w/w % | | w/w % | |
|---|---|---|---|---|---|---|
| Comp. 1.2 | 0.2 | Irgacolor Yellow 3GLM | 0.8 | Tinuvin NOR 371 | 0.2 | CGX UVA006 |
| Inv. 1.3 | 0.2 | Cromophtal Yellow 3GNP | 0.8 | Tinuvin NOR 371 | | |
| Comp. 1.4 | 0.06 | Cromophtal Yellow 3GNP | 0.8 | Tinuvin NOR 371 | 0.2 | CGX UVA006 |
| Inv. 1.5 | 0.2 | Cromophtal Yellow 2RLP | 0.5 | Tinuvin NOR 371 | | |
| Comp. 1.6 | 0.2 | Cromophtal Yellow 2RF | 0.15 | Tinuvin NOR 371 | | |
| Inv. 1.7 | 0.2 | Cromophtal Yellow 8GNP | | Tinuvin NOR 371 | | |
| Inv. 1.8 | 0.2 | Cromophtal Yellow HRPA | 0.015 | Tinuvin NOR 371 | | |
| Inv. 1.9 | 0.2 | Cromophtal Yellow GRP | 0.5 | Tinuvin NOR 371 | | |
| Comp. 1.10 | 0.7 | Ni-quencher | 0.5 | Chimassorb 81 | | |

TABLE 2

| Sample id. | A | B | C |
|---|---|---|---|
| Inv. 1.1 | −0.042 | −0.329 | −0.49 |
| Comp. 1.2 | 0.076 | −0.361 | −0.43 |
| Inv. 1.3 | −0.047 | −0.394 | −0.80 |
| Comp. 1.4 | 0.042 | −0.451 | −0.44 |
| Inv. 1.5 | −0.159 | −0.155 | −0.51 |
| Comp. 1.6 | −0.073 | −0.089 | −0.80 |
| Inv. 1.7 | 0.002 | −0.470 | −0.68 |
| Inv. 1.8 | −0.046 | −0.186 | −0.60 |
| Inv. 1.9 | −0.046 | −0.267 | −0.68 |
| Comp. 1.10 | 0.672 | −0.453 | −0.23 |

EXAMPLE 2

A spectral light modification according to this invention is tested for its effect on gypsophilia, a cut flower used in great quantities in floral arrangements and bouquets. It is compared to a control spectral light modification of the 380-500 nm region falling outside the scope of this invention, and to a colorless control check. The spectral light modifications are reported in FIG. 3 and are obtained by way of plastic films covering the tunnels in which the flowers are grown (180 microns thick blown films made of 3:2 LDPE/LLDPE blends). The spectra in FIG. 3 were measured with a Perkin Elmer LAMBDA 35 UV/Vis spectrometer, equipped with an integrating sphere. The film compositions are shown in Table 3.

TABLE 3

| Sample id. | w/w % | | w/w % | | w/w % | | | |
|---|---|---|---|---|---|---|---|---|
| Inv. 2.1 | 0.085 | Irgacolor Yellow 3GLM | 0.015 | Ultramarine blue | 0.6 | Tinuvin 494 | 0.15 | Tinuvin 326 |
| Comp. 2.2 | 0.7 | Ni-quencher | 0.5 | Chimassorb 81 | | | | |
| Comp. 2.3 | 0.6 | Tinuvin 494 | 0.15 | Tinuvin 326 | | | | |

Three identical tunnels, under which gypsophilia is grown, are separately covered at a commercial farm in Al Taif, Saudi Arabia, one with each of the above films, and the number of gypsophilia flowering branches of commercial quality collected for sale is recorded over one full year, from the beginning of October of one year to the end of September one year later. The results obtained are shown below in Table 4, along with the spectral modification parameters describing the invention.

TABLE 4

| Sample id. | Number of gypsophilia flowering branches | A | B | C |
|---|---|---|---|---|
| Inv. 2.1 | 29900 | 0.038 | −0.333 | −0.24 |
| Comp. 2.2 | 11875 | 0.672 | −0.453 | −0.23 |
| Comp. 2.3 | 16325 | 0.152 | 0.064 | −0.07 |

EXAMPLE 3

A spectral light modification according to this invention is tested for its effect on cucumbers grown in controlled condition in a climate-control chamber. It is compared to a wavelength-neutral control light modification reducing photosynthetically active radiation (flux of photons of wavelength between 400 and 700 nm) by the same amount as the inventive film and to a control spectral light modification of the 380-500 nm region falling outside the scope of this invention. The spectral light modifications, measured with a Perkin Elmer LAMBDA 35 UV/Vis spectrometer, equipped with an integrating sphere, are as reported in FIG. 4. The spectra are obtained by way of cover plastic films (150 microns LDPE blown films) of the same type as those commonly used on greenhouses and tunnels. Such films contain additives able to modify the solar spectrum as shown in FIG. 4, as well as other additives commonly used to make them stable to the environment. Their composition is shown in Table 5.

TABLE 5

| Sample id. | w/w % | | w/w % | | | |
|---|---|---|---|---|---|---|
| Inv. 3.1 | 0.2 | Irgacolor Yellow 3GLM | 0.8 | Tinuvin NOR 371 | | |
| Comp. 3.2 | 0.01 | Carbon black | | | | |
| Comp. 3.3 | 0.2 | Irgacolor Yellow 3GLM | 0.8 | Tinuvin NOR 371 | 0.2 | CGX UVA006 |

The solar visible light spectrum is approximated by a set of fluorescent, incandescent and low sodium pressure artificial lights. The spectral light distribution inside each box is measured in 2 nm steps at the beginning of the experimental period with a Li-Cor 1800 spectroradiometer. All light measurements made in different positions beneath the box showed the homogeneity of light. Weekly irradiance measurements were taken during the experimental period to check for possible variability in spectral quality and relative irradiance level, and none were found.

Trials were carried out with uniform plants of *Cucumis sativus* cv Verde obtained from seeds germinated in greenhouse. The seedlings are then transplanted individually in 51 plastic pots containing peat and sand (1:1) and transferred in a walk-in growth chamber. The filters are placed at 20 cm from the artificial light sources for air circulation to prevent damages for high temperature. Twenty plants are grown under identical conditions of temperature, watering, fertilization and handling under both filters, at 26±2° C. under 16 h light/8 h dark cycles. The plants are well watered during the entire experimental period. They are placed at 5 cm apart and their tops are maintained at the calculated distance to the filter by adjusting the height of the artificial light and filters as plant elongate during the experiments. Flowering and fruit setting occurred at the same time in both cases, and fruits are collected and weighed as they ripen. The final results are reported in Table 6 in terms of the fruit weight per plant collected under the inventive filter (sample 3.1) and the colored control (sample 3.3) relative to the fruit weight per plant collected under the neutral control filter (sample 3.2) taken as 100, along with the spectral modification parameters describing the invention.

TABLE 6

| Sample id. | Relative wt. of cucumbers per plant | A | B | C |
|---|---|---|---|---|
| Inv. 3.1 | 159 | −0.042 | −0.329 | −0.49 |
| Comp. 3.2 | 100 | 0.018 | −0.047 | −0.25 |
| Comp. 3.3 | 89 | 0.076 | −0.361 | −0.43 |

EXAMPLE 4

A spectral light modification according to this invention is tested for its effect on tomatoes grown in controlled condition in a climate-control chamber. It is compared to a wavelength-neutral control light modification reducing photosynthetically active radiation (flux of photons of wavelength between 400 and 700 nm) by the same amount as the inventive film and to two control spectral light modifications of the 380-500 nm region falling outside the scope of this invention. The spectral light modification, measured with a Perkin Elmer LAMBDA 35 UV/Vis is spectrometer, equipped with an integrating sphere, are as reported in FIG. 5, and are obtained by way of cover plastic films (150 microns LDPE blown films) of the same type as those commonly used on greenhouses and tunnels. Such films contain additives able to modify the solar spectrum as shown in FIG. 5, as well as other additives commonly used to make them stable to the environment. Their composition is shown in Table 7.

TABLE 7

| Sample id. | w/w % | | w/w % | | | |
|---|---|---|---|---|---|---|
| Inv. 4.1 | 0.2 | Irgacolor Yellow 3GLM | 0.8 | Tinuvin NOR 371 | | |
| Comp. 4.2 | 0.01 | Carbon black | | | | |
| Comp. 4.3 | 1 | Smartlight RL 1000 | 0.8 | Tinuvin NOR 371 | | |
| Comp. 4.4 | 0.2 | Irgacolor Yellow 3GLM | 0.8 | Tinuvin NOR 371 | 0.2 | CGX UVA006 |

The solar visible light spectrum is approximated by a set of fluorescent, incandescent and low sodium pressure artificial lights. The spectral light distribution inside each box is measured in 2 nm steps at the beginning of the experimental period with a Li-Cor 1800 spectroradiometer. All light measurements made in different positions beneath the box show the homogeneity of light. Weekly irradiance measurements are taken during the experimental period to check for possible variability in spectral quality and relative irradiance level, and none are found.

Trials are carried out with uniform plants of *Lycopersicon esculentum* cv Roma obtained from seeds germinated in greenhouse. The seedlings are then transplanted individually in 51 plastic pots containing peat and sand (1:1) and transferred in a walk-in growth chamber. The filters are placed at 20 cm from the artificial light sources for air circulation to prevent damages for high temperature. Thirtysix plants are grown under identical conditions of temperature, watering, fertilization and handling under each filters, at 26±2° C. under 16 h light/8 h dark cycles. The plants are well watered during the entire experimental period. They are placed at 5 cm apart and their tops are maintained at the calculated distance to the filter by adjusting the height of the artificial light and filters as plant elongate during the experiments. Flowering occurs at the same time in all cases, whereas fruit setting, and the beginning of ripening, happens one week earlier for those plants exposed to the inventive spectral light modification of sample 4.1. Fruits are collected and weighed as they ripen until, at the end of the third month of modified light exposure, also all unripened fruits are picked and weighed. The final results are reported in Table 8 in terms of the fruit weight per plant collected under the inventive filter (sample 4.1) and under the colored control filters (samples 4.3 and 4.4) relative to the fruit weight per plant collected under the neutral control filter (sample 4.2) taken as 100, along with the spectral modification parameters describing the invention.

TABLE 8

Relative wt. of tomatoes per plant

| Sample id. | ripe | unripe | total | A | B | C |
|---|---|---|---|---|---|---|
| Inv. 4.1 | 220 | 66 | 156 | −0.042 | −0.329 | −0.49 |
| Comp. 4.2 | 100 | 100 | 100 | 0.018 | −0.047 | −0.25 |
| Comp. 4.3 | 55 | 52 | 54 | −0.179 | 0.045 | −0.26 |
| Comp 4.4 | 102 | 83 | 93 | 0.076 | −0.361 | −0.43 |

EXAMPLE 5

A spectral light modification according to this invention is tested for its effect on courgettes (a.k.a. zucchini, *Cucurbita pepo* L.). It is compared to a control spectral light modification of the 380-500 nm region falling outside the scope of this invention, and to a colorless control check. The spectral light modifications are reported in FIG. 6 and are obtained by way of plastic films covering the tunnels in which the flowers are grown. Sample 5.1 is a 180 microns thick blown film made of 3:2 LDPE/LLDPE blends, samples 5.2 and 5.3 are 150 microns thick blown films made of LDPE. The spectra in FIG. 6 were measured with a Perkin Elmer LAMBDA 35 UV/Vis spectrometer, equipped with an integrating sphere. The film compositions are shown in Table 9.

TABLE 9

| Sample id. | w/w % | | w/w % | | w/w % | | w/w % | |
|---|---|---|---|---|---|---|---|---|
| Inv. 5.1 | 0.085 | Irgacolor Yellow 3GLM | 0.015 | Ultramarine blue | 0.6 | Tinuvin 494 | 0.15 | Tinuvin 326 |
| Comp. 5.2 | 1 | Smartlight RL 1000 | 0.8 | Tinuvin NOR 371 | | | | |
| Comp. 5.3 | 0.8 | Tinuvin NOR 371 | | | | | | |

Three identical tunnels 5 m wide, 10 m long and 2.5 m high, under each of which 16 plants of courgettes are grown, are separately covered at a University research farm in Pisa, Italy, one with each of the above films. The fruits are picked during the months of September and October. The final results are reported in Table 10 in terms of the fruit weight per plant collected under the inventive filter (sample 5.1) and under the colored control filter (sample 5.2) relative to the fruit weight per plant collected under the colorless control filter (sample 5.3) taken as 100, along with the spectral modification parameters describing the invention.

TABLE 10

| Sample id. | Relative wt. of courgettes per plant | A | B | C |
|---|---|---|---|---|
| Inv. 5.1 | 114 | 0.038 | −0.333 | −0.24 |
| Comp. 5.2 | 90 | −0.179 | 0.045 | −0.26 |
| Comp. 5.3 | 100 | −0.063 | 0.016 | −0.07 |

All examples clearly show more plant growth for the samples exposed to light according to the present invention compared to other light exposures.

The invention claimed is:

1. A process for enhancing bio-mass production in agricultural applications, by incorporating one or more pigments in a thermoplastic or crosslinked polymer, which is in the form of a film or glazing for greenhouses or small tunnel covers, a film or filament for shading nets and screens, mulch films, non-wovens or molded articles for the protection of young plants; and exposing the plant through or over that thermoplastic or crosslinked polymer to actinic radiation, characterized in that a) the resulting average light intensity variations (LIV) in the range between 380 and 450 nm are such that $(LIV_{410-450} - LIV_{380-410})/|LIV_{410-450}| =$
$\{[(I-I_0)/I_0]_{410-450} - [(I-I_0)/I_0]_{380-410}\}/\{$absolute value of $[(I-I_0)/I_0]_{410-450}\} \leq 0.04;$ b) the resulting average light intensity variations in the range between 410 and 500 nm are such that $(LIV_{410-450} - LIV_{450-500})/|LIV_{410-450}| =$
$\{[(I-I_0)/I_0]_{410-450} - [(I-I_0)/I_0]_{450-500}\}/\{$absolute value of $[(I-I_0)/I_0]_{410-450}\} \leq -0.15;$ and c) the resulting average light intensity variation in the range between 410 and 450 nm $LIV_{410-450} = -0.90 \leq [(I-I_0)/I_0]_{410-450} \leq -0.10$ or $+0.05 \leq [(I-I_0)/I_0]_{410-450} \leq +0.50;$ wherein $I_0$ in the respective wavelength range is the average light intensity in the range of the sample without pigment, multiplied by the wavelength interval;

I in the respective wavelength range is the average light intensity in the range of the sample containing the pigment, multiplied by the wavelength interval and wherein the pigments are selected from the group consisting of C.I. Pigment Yellow 184, C.I. Pigment Yellow 93, C.I. Pigment Yellow 95, C.I. Pigment Yellow 168, C.I. Pigment Yellow 68, C.I. Pigment Yellow 183, C.I. Pigment Yellow 109, C.I. Pigment Yellow 13, C.I. Pigment Yellow 62, C.I. Pigment Yellow 199, C.I. Pigment Yellow 110, C.I. Pigment Yellow 128, C.I. Pigment Yellow 180, C.I. Pigment Yellow 155, C.I. Pigment Yellow 151, C.I. Pigment Yellow 215, C.I. Pigment Yellow 138 and C.I. Pigment Yellow 139.

2. A process according to claim 1 wherein the one or more pigments are incorporated in an amount of totally 0.01% to 2% by weight, based on the weight of the thermoplastic or crosslinked polymer.

3. A process according to claim 1 wherein the pigment is C.I. Pigment Yellow 184.

4. A process according to claim 1 wherein the polymer is a thermoplastic polymer selected from the group consisting of a polyolefin, a polyester, a polyvinylalcohol, a polyvinylacetate and a polycarbonate.

5. A process according to claim 4, wherein the thermoplastic polymer is in the form of a film with a thickness from 10 µ to 300µ.

6. A process according to claim 5 wherein the film is a multilayer construction of between 2 and 7 polymer layers containing one or more pigments in at least 1 layer.

7. A process according to claim 1 wherein the polymer is a crosslinked polymer which is a paint or coating on a transparent inorganic or organic support.

8. A process according to claim 1 wherein at least one additional additive is incorporated in the thermoplastic or crosslinked polymer, which additive is selected from the group consisting of a UV-absorber, a sterically hindered amine light stabilizer, a phenolic antioxidant, a phosphite or phosphonite, an antistatic additive, a processing aid, a filler or reinforcing material and an antifog additive.

* * * * *